US007102717B2

(12) United States Patent
Chang et al.

(10) Patent No.: US 7,102,717 B2
(45) Date of Patent: Sep. 5, 2006

(54) METHOD OF FORMING A COLOR FILTER HAVING VARIOUS THICKNESSES AND A TRANSFLECTIVE LCD WITH THE COLOR FILTER

(75) Inventors: Ming-Chin Chang, Yunlin (TW); Yang-En Wu, Taipei (TW); Po-Lun Chen, Chiayi (TW); Chih-Jen Hu, Jhongli (TW); Ching-Huan Lin, Sinying (TW)

(73) Assignee: AU Optronics Corp., Hsinchu (TW)

( * ) Notice: Subject to any disclaimer, the term of this patent is extended or adjusted under 35 U.S.C. 154(b) by 40 days.

(21) Appl. No.: 10/693,209

(22) Filed: Oct. 24, 2003

(65) Prior Publication Data

US 2004/0119921 A1    Jun. 24, 2004

(30) Foreign Application Priority Data

Dec. 23, 2002    (TW) ............................... 91137026 A

(51) Int. Cl.
*G02F 1/1343* (2006.01)
(52) U.S. Cl. .................. 349/138; 349/106; 349/114
(58) Field of Classification Search ........ 349/106–109, 349/113–114
See application file for complete search history.

(56) References Cited

U.S. PATENT DOCUMENTS

| | | | | |
|---|---|---|---|---|
| 4,876,165 A * | 10/1989 | Brewer et al. ................ 430/7 |
| 5,093,738 A * | 3/1992 | Watanabe et al. ........... 349/106 |
| 5,963,285 A * | 10/1999 | Kim ............................ 349/122 |
| 6,033,813 A * | 3/2000 | Endo et al. ..................... 430/7 |
| 6,038,008 A * | 3/2000 | Kim et al. ................... 349/138 |
| 6,424,397 B1* | 7/2002 | Kuo ............................ 349/139 |
| 6,426,166 B1* | 7/2002 | Nishikawa et al. ............. 430/7 |
| 6,542,209 B1 | 4/2003 | Kim et al. ................... 349/106 |
| 6,573,969 B1* | 6/2003 | Watanabe et al. ........... 349/155 |
| 6,633,353 B1* | 10/2003 | Seki et al. ................... 349/113 |
| 6,697,135 B1* | 2/2004 | Baek et al. .................. 349/106 |
| 6,801,274 B1* | 10/2004 | Suzuki ........................ 349/106 |
| 2001/0045560 A1* | 11/2001 | Bijlsma ......................... 257/72 |
| 2002/0003596 A1 | 1/2002 | Kim ............................. 349/106 |
| 2003/0117553 A1 | 6/2003 | Yamada ....................... 349/113 |
| 2004/0080684 A1* | 4/2004 | Rho ............................ 349/106 |

FOREIGN PATENT DOCUMENTS

| | | |
|---|---|---|
| JP | 2000-347022 | 12/2000 |
| JP | 2001-222003 | 8/2001 |
| JP | 2003-66437 | 3/2003 |
| TW | 594235 | 6/2004 |

OTHER PUBLICATIONS

Chinese Office Action, Dec. 16, 2005, no translation.
Taiwan Office Action, Jan. 6, 2006, no translation.

* cited by examiner

*Primary Examiner*—Andrew Schechter
*Assistant Examiner*—Phu Vu
(74) *Attorney, Agent, or Firm*—Thomas, Kayden, Horstemeyer & Risley

(57) ABSTRACT

A transflective liquid crystal display device implementing a color filter having various thicknesses. An insulating layer is formed on a lower substrate. A lower electrode is formed on the insulating layer, wherein the lower electrode has a transmissive portion and a reflective portion. An upper substrate opposing the lower substrate is provided, wherein a side of the upper substrate has a color filter having various thicknesses. A planarization layer is formed on the color filter, wherein the planarization layer is opposite to the lower substrate. An upper electrode is formed on the planarization layer. A liquid crystal layer is interposed between the upper and lower substrates.

11 Claims, 5 Drawing Sheets

METHOD OF FORMING A COLOR FILTER HAVING VARIOUS THICKNESSES AND A TRANSFLECTIVE LCD WITH THE COLOR FILTER

BACKGROUND OF THE INVENTION

1. Field of the Invention

The present invention relates to a transflective liquid crystal display device implementing a color filter having various thicknesses, and more particularly, to a method of forming a color filter having various thicknesses.

2. Description of the Related Art

Liquid crystal display (LCD) devices are widely used as displays in devices such as portable televisions and notebook computers. Liquid crystal display devices are classified into two types. One is a transmissive type liquid crystal display device using a backlight as a light source, and another is the reflective type liquid crystal display device using an external (or ambient) light source, such as sunlight or a lamp. It is difficult to decrease the weight, volume, and power consumption of the transmissive type LCD due to the power requirements of the backlight component. The reflective type LCD has the advantage of not requiring a backlight component, but cannot operate without an external light source.

In order to overcome the drawbacks of these two types of LCDs, a transflective LCD device which can operate as both a reflective and transmissive type LCD is disclosed. The transflective LCD device has a reflective electrode in a pixel region, wherein the reflective electrode has a transmissive portion. Thus, the transflective LCD device has lower power consumption than the conventional transmissive type LCD device because a backlight component is not used when there is a bright external light. Further, in comparison with the reflective type LCD device, the transflective LCD device has the advantage of operating as a transmissive type LCD device using backlight when no external light is available.

FIG. 1, a sectional view of a conventional transflective LCD device, helps to illustrate the operation of such devices. As shown in FIG. 1, the conventional transflective LCD device includes a lower substrate 100 (also referred to as an array substrate), an upper substrate 160 and a liquid crystal layer 130 interposed therebetween. A common electrode 140 and a color filter 150 are formed on the upper substrate 160. An insulating layer 110 and a reflective electrode 120 are formed on the lower substrate 100, wherein the reflective electrode 120 has an opaque portion 122 and a transparent portion 124. The opaque portion 122 of the reflective electrode 120 can be an aluminum layer and the transparent portion 124 of the reflective electrode 120 can be an ITO (indium tin oxide) layer. The opaque portion 122 reflects the ambient light 170, while the transparent portion 124 transmits light 180 from the backlight device (not shown). The liquid crystal layer 130 includes a plurality of spherical spacers (not shown) used to keep a fixed layer thickness or cell gap of the liquid crystal layer 130. Thus, the transflective LCD device is operable in both a reflective mode and a transmissive mode.

The conventional transflective LCD device, however, has the drawback of different color reproduction levels (color purity) in reflective and transmissive modes, due to, referring to FIG. 1, the backlight 180 penetrating the transparent portion 124 passing through the color filter 150 once and the ambient light 170 reflected from the opaque portion 122 passing through the color filter 150 twice. This greatly degrades the display quality of transflective LCDs.

Recently, a method of forming a color filter having various thicknesses on a substrate, to resolve the color purity issue, has been disclosed. FIGS. 2A~2C are sequential sectional views illustrating a fabricating process for the color filter having various thicknesses according to the prior art.

In FIG. 2A, a transparent resist layer 210 is coated and patterned on a substrate 200 (e.g. the upper substrate). The transparent resist layer 210 corresponds to a reflective region 201 of a transflective LCD device.

In FIG. 2B, a patterned red resist layer 220 is coated and patterned on part of the substrate 200 and part of the transparent resist layer 210.

In FIG. 2C, a patterned green resist layer 230 and a patterned blue resist layer 240 are sequentially coated and patterned on part of the substrate 200 and part of the transparent resist layer 210. Thus, a conventional color filter having various thicknesses is obtained.

Nevertheless, the method requires additional photolithography (that is, an added mask) to form the transparent resist layer 210, and thereby increases costs. Referring to FIG. 2C, since the resist layers 220, 230 and 240 are coated on the rough substrate surface having the transparent resist layer 210; it is difficult to control the thicknesses of the resist layers 220, 230 and 240. The conventional method, however, cannot exactly solve the problem of different levels of color purity.

SUMMARY OF THE INVENTION

The object of the present invention is to provide a transflective liquid crystal display device implementing a color filter having various thicknesses.

Another object of the present invention is to provide a transflective liquid crystal display device with equal color purity in both transmissive and reflective modes.

Yet another object of the present invention is to provide a method of forming a color filter having various thicknesses on a substrate.

In order to achieve these objects, the present invention provides a transflective liquid crystal display device. An insulating layer is formed on a lower substrate. A lower electrode is formed on the insulating layer, wherein the lower electrode has a transmissive portion and a reflective portion. An upper substrate opposing the lower substrate is provided, wherein a side of the upper substrate has a color filter having various thicknesses. A planarization layer is formed on the color filter, wherein the planarization layer is opposite to the lower substrate. An upper electrode is formed on the planarization layer. A liquid crystal layer is interposed between the upper and lower substrates.

The present invention also provides a method of forming a color filter having various thicknesses. A substrate having a first region and a second region thereon is provided. A thick color resist layer comprising positive photoresist is formed on the substrate. A photolithography procedure using an exposure light and a photomask is performed on the thick color resist layer to remove part of the thick color resist layer in the second region, thus a thin color resist layer is formed on the substrate in the second region. The photomask comprises a first pattern shading the first region from exposure and a second pattern decreasing intensity of exposure penetrating the second pattern, wherein the second pattern can be a half-tone pattern corresponding to the second region. A planarization layer is formed to cover the thick and thin color resist layers. The first region corresponds to a transmissive region of a transflective LCD device and the second region corresponds to a reflective region of the transflective LCD device.

The present invention also provides another method of forming a color filter having various thicknesses. A substrate having a first region and a second region thereon is provided. A thick color resist layer comprising negative photoresist is formed on the substrate. A photolithography procedure using an exposure light and a photomask is formed on the thick color resist layer to remove part of the thick color resist layer in the second region, thus a thin color resist layer is formed on the substrate in the second region. The photomask comprises a first pattern transmitting exposure to the first region and a second pattern decreasing an intensity of exposure penetrating the second pattern, wherein the second pattern can be a half-tone pattern corresponding to the second region. A planarization layer is formed to cover the thick and thin color resist layers. The first region corresponds to a transmissive region of a transflective LCD device and the second region corresponds to a reflective region of the transflective LCD device.

The present invention improves on the prior art in that the present method uses one photolithography with one photomask to form a color filter having various thicknesses. The photomask comprises two patterns each with different transmittance. The present invention uses only one photomask to form the color filter having various thicknesses, thereby reducing manufacturing costs and ameliorating the disadvantages of the prior art.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

With reference to the drawings, preferred embodiments of the invention are described below.

Figure 1:
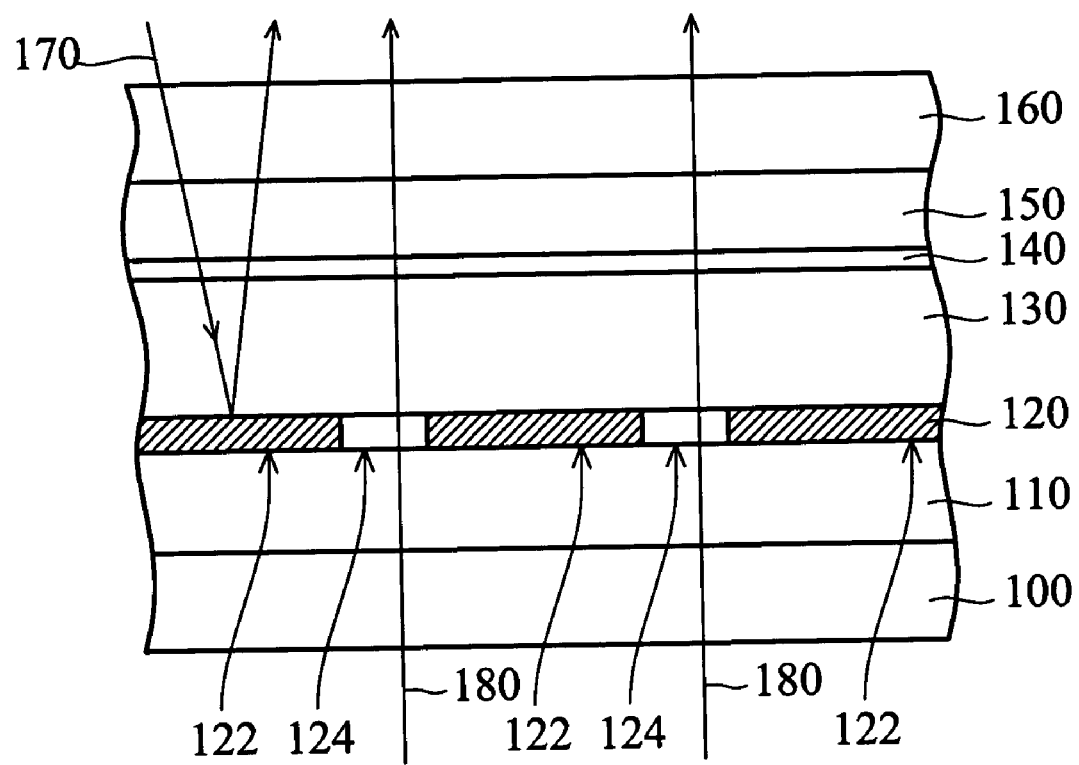
FIG. 1 is a sectional view of a transflective LCD device according to the prior art, illustrating the operation thereof.
Figure 2A:
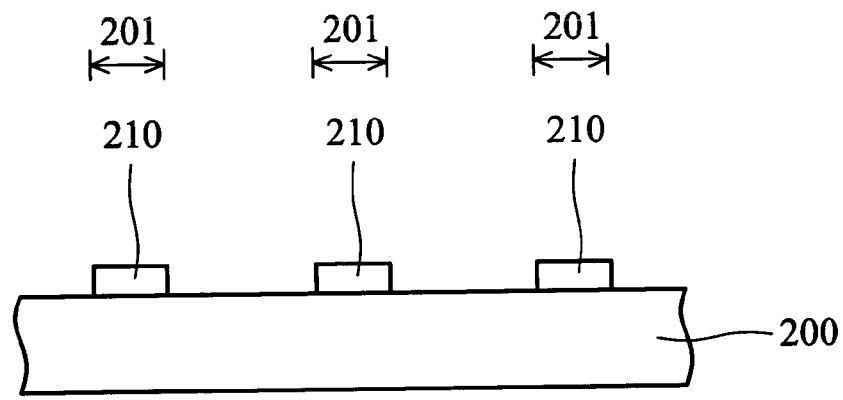
FIGS. 2A~2C are sequential sectional views illustrating a fabricating process for a color filter having various thicknesses according to the prior art.
Figure 2B:
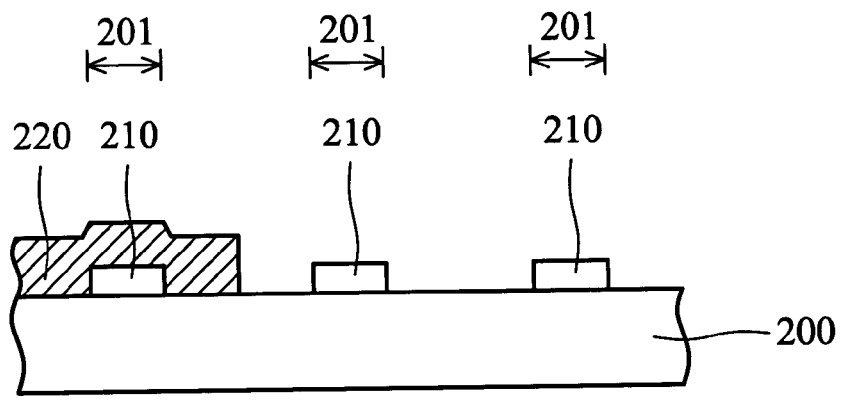
Figure 2C:
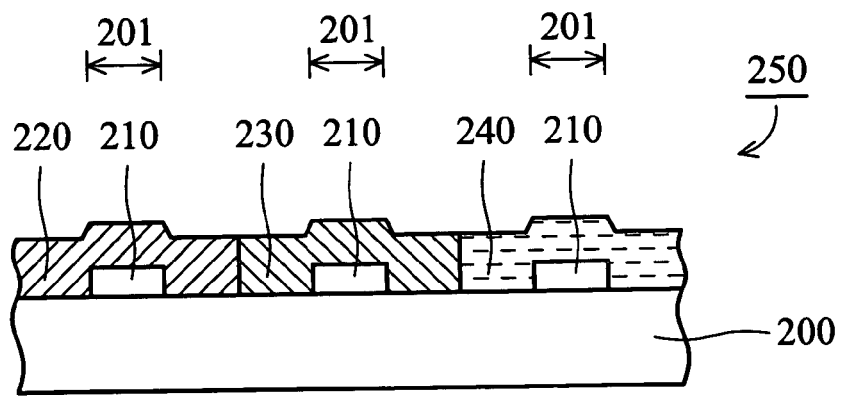
Figure 3A:
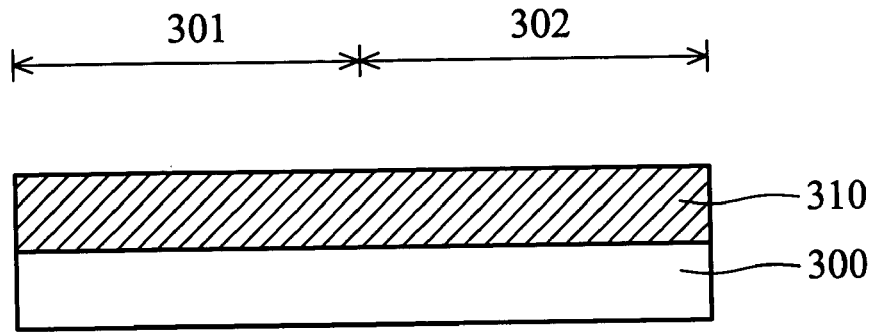
FIGS. 3A~3C are sequential sectional views illustrating a fabricating process for a color filter having various thicknesses according to the present invention.
Figure 3B:
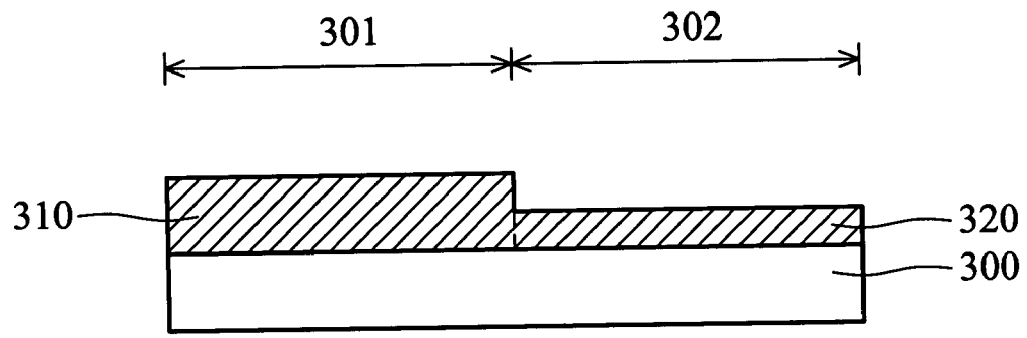
Figure 3C:
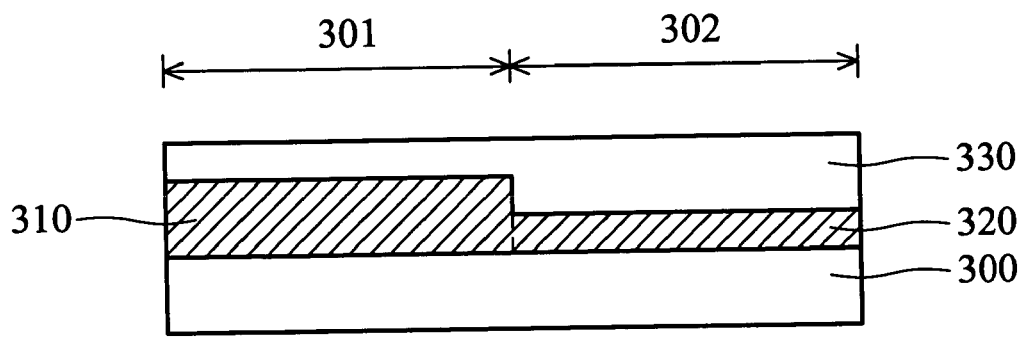

FIGS. 3A~3C are sequential sectional views illustrating a fabricating process for a color filter having various thicknesses according to the present invention. In order to simplify the illustration, FIGS. 3A~3C shows a partial sectional view in one pixel region. That is, the number of pixel regions may be very large. Additionally, a black matrix (not shown) can be formed to surround each pixel region. In order to avoid obscuring aspects of the present invention, the formation of the black matrix (not shown) is not described here.

In FIG. 3A, a substrate 300 such as a glass substrate is provided. The substrate 300 typically serves as an upper substrate of an LCD device. The substrate 300 has a predetermined first region 301 and a predetermined second region 302 thereon. For example, in a transflective LCD device, the first region 301 corresponds to the transmissive region and the second region 302 corresponds to the reflective region.

In FIG. 3A, a thick color resist layer 310 is coated on the substrate 300. The thick color resist layer 310 can be red, green or blue.

In FIG. 3B, part of the thick color resist layer 310 in the second region 302 is removed to form a thin color resist layer 320 on the substrate 300 in the second region 302. Hereinafter, two demonstrative examples for removing part of the thick color resist layer 310 follow, but are not intended to limit the present invention.

Figure 4:
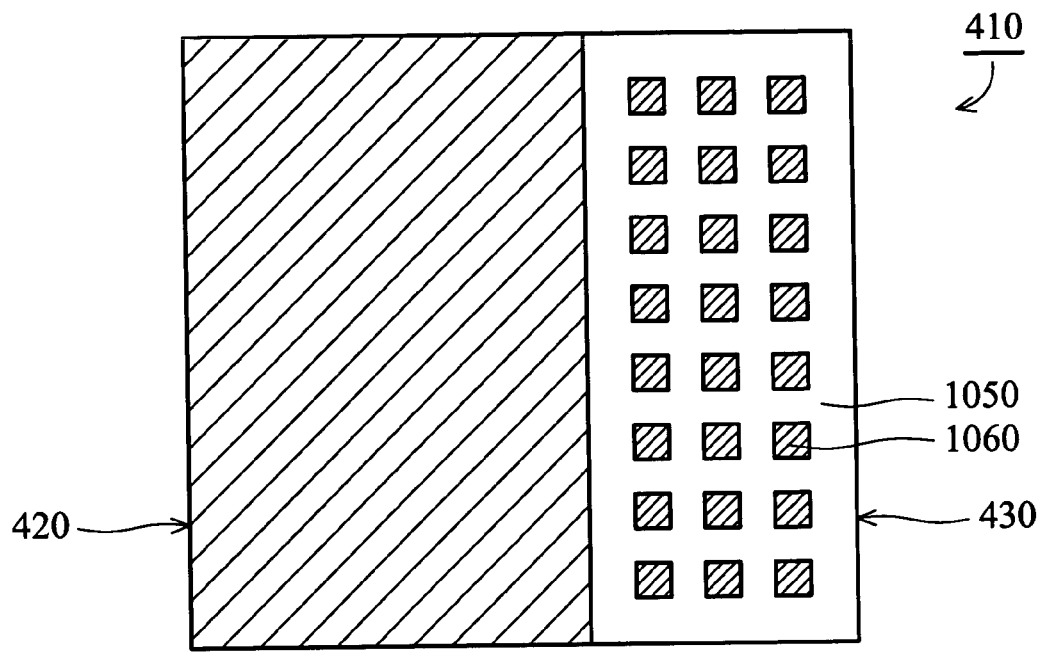
FIG. 4 is a plane view showing a photomask used in the present fabricating process.

In the first example, the thick color resist layer 310 is composed of positive photoresist. A photolithography procedure using an exposure light (not shown) and a photomask (or reticle) 410 shown in FIG. 4 is performed on the thick color resist layer 310 to remove part of the thick color resist layer 310 in the second region 302. Thus, the thin color resist layer 320 is formed on the substrate 300 in the second region 302. In FIG. 4, the photomask 410 comprises a first pattern 420 corresponding to the first region 301 and a second pattern 430 corresponding to the second region 302. The first pattern 420 shades the first region 301 from exposure; thereby preventing exposure to the thick color resist layer 310. The second pattern 430 decreases the intensity of exposure penetrating the second pattern 430, thereby reducing the exposure resolution in the second region 302. For example, the exposure resolution can be decreased to about ½.

In the first example, a half-tone pattern is employed to serve as the second pattern 430 with the property of reducing exposure intensity. The second pattern 430 can be constructed from a plurality of micro patterns 1060 spaced out a slit 1050 from each other. The micro patterns 1060 can be transparent or opaque. When the micro pattern 1060 is transparent, the slit 1050 is opaque. Contrarily, as shown as FIG. 4, when the micro pattern 1060 is opaque, the slit 1050 is transparent. The exposure intensity through the second pattern 430 can be partially reduced by controlling the sizes of the slit 1050 and/or the micro patterns 1060. Thus, the thick color resist layer 310 cannot be thoroughly exposed and the thin color resist layer 320 having a certain thickness can remain after partial exposure and development. The shape of each micro pattern 1060 can be any shape. For example, the micro pattern 1060 can be rectangular (square or oblong), circular, rhombic, triangular or others. Additionally, the entirety of the micro patterns 1060 together forms a stripe. Moreover, the thickness of the thin color resist layer 320 can be controlled by adjusting the sizes of the slit 1050 and/or the micro patterns 1060.

Figure 5:
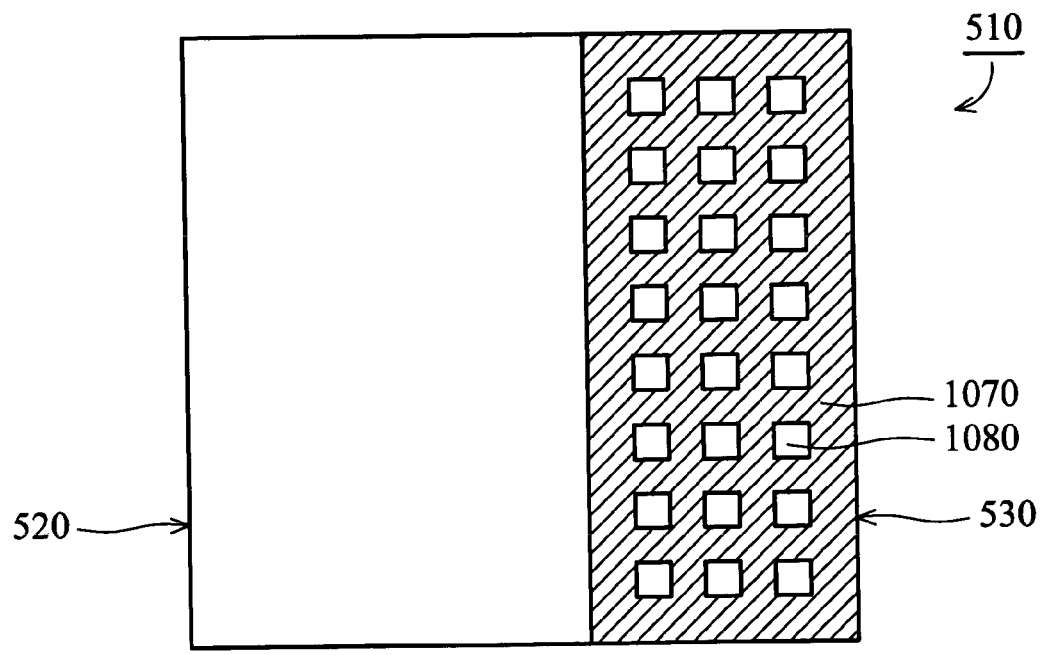
FIG. 5 is a plane view showing another photomask used in the present fabricating process.

In the second example, the thick color resist layer 310 is composed of negative photoresist. A photolithography procedure using an exposure light (not shown) and a photomask (or reticle) 510 shown in FIG. 5 is performed on the thick color resist layer 310 to remove part of the thick color resist layer 310 in the second region 302. Thus, the thin color resist layer 320 is formed on the substrate 300 in the second region 302. In FIG. 5, the photomask 510 comprises a first pattern 520 corresponding to the first region 301 and a second pattern 530 corresponding to the second region 302. The first pattern 520 transmits exposure to the first region 301, thereby exposing the thick color resist layer 310. The second pattern 530 decreases the intensity of the exposure penetrating the second pattern 530, thereby reducing the exposure resolution in the second region 302. For example, the exposure resolution can be decreased to about ½.

In the second example, a half-tone pattern is employed to serve as the second pattern 530 with the property of reducing exposure intensity. The second pattern 530 can be constructed from a plurality of micro patterns 1080 spaced out a slit 1070 from each other. The micro patterns 1080 can be transparent or opaque. As shown as FIG. 5, when the micro pattern 1080 is transparent, the slit 1070 is opaque. Contrarily, when the micro pattern 1080 is opaque, the slit 1070 is transparent. The exposure intensity through the second pattern 530 can be partially reduced by controlling the sizes of the slit 1070 and/or the micro patterns 1080. Thus, the thick color resist layer 310 can be thoroughly exposed and the thin color resist layer 320 having a certain thickness can remain after partial exposure and development. The shape of each micro pattern 1080 can be any shape. For example, the micro pattern 1080 can be rectangular (square or oblong), circular, rhombic, triangular or others. Additionally, the entirety of the micro patterns 1080 together forms a stripe. Moreover, the thickness of the thin color resist layer 320 can be controlled by adjusting the sizes of the slit 1070 and/or the micro patterns 1080.

It should be noted that, the present method requires only one photolithography step and uses only one photomask (410 or 510) to form a color filter having various thicknesses, thereby reducing manufacturing costs. Moreover, it is easy to control the thickness of the color filter because of the smooth substrate 300.

Next, referring to FIG. 3C, a transparent planarization layer 330 is formed on the thick and thin color resist layers 310 and 320. The transparent planarization layer 330 can be an organic insulating layer or an inorganic insulating layer. The organic insulating material may be BCB (benzocyclobutene), acryl resin and so on. The inorganic insulating material may be $SiO_2$, $SiN_x$ and so on. Thus, a color filter having various thicknesses is obtained.

Figure 6:
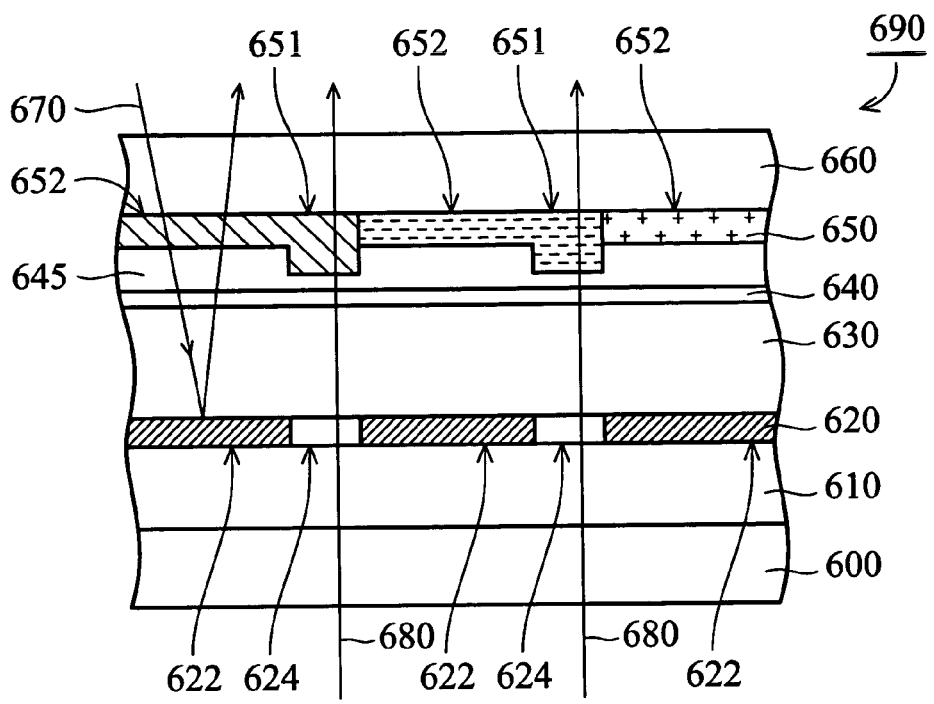
FIGS. 6 and 7 are sectional views of transflective LCD devices employing the color filter of the present invention.

FIG. 6 is a sectional view of a transflective LCD device 690 employing the color filter of the present invention. In order to avoid obscuring aspects of the present invention, the detailed LCD process is not described. A lower substrate 600 having a TFT array (not shown) and an insulating layer 610 thereon is provided. A lower electrode (or called a reflective electrode) 620 is formed on the insulating layer 610. The lower electrode 620 has a reflective portion 622 and a transmissive portion 624. The reflective portion 622 can be an aluminum layer and the transmissive portion 624 can be an ITO (indium tin oxide) or IZO (indium zinc oxide) layer. An upper substrate 660 opposing the lower substrate 600 is provided, wherein a side of the upper substrate 660 has a color filter 650 having various thicknesses, which is fabricated by the present method. The color filter 650 has a first thickness portion 651 corresponding to the transmissive portion 624 and a second thickness portion 652 corresponding to the reflective portion 622. The first thickness portion 651 is thicker than the second thickness portion 652. A planarization layer 645 (or called an overcoat) composed of a high transmittance material (e.g. $SiO_2$ or $SiN_x$) is formed on the color filter 650, wherein the planarization layer 645 is opposite to the lower substrate 600. An upper electrode (or called a common electrode) 640 is formed on the planarization layer 645. Lastly, a liquid crystal material fills a space between the upper substrate 660 and the lower substrate 600 to form a liquid crystal layer 630.

According to the embodiment, referring to FIG. 6, for a reflective mode of the transflective LCD device 690 of the present invention, an ambient light 670 from an exterior light source (not shown) passes through the second thickness portion 652 of the color filter layer 650 twice. For a transmissive mode of the transflective LCD device 690 of the present invention, a backlight 680 from a backlight source (not shown) passes through the first thickness portion 651 of the color filter layer 650 once. Since the first thickness portion 651 is thicker than the second thickness portion 652, the total passage of the ambient light 670 passing through the color filter layer 650 is similar to that of the backlight 680, thereby normalizing color reproduction (color purity) between reflective and transmissive modes of the transflective LCD device.

Figure 7:
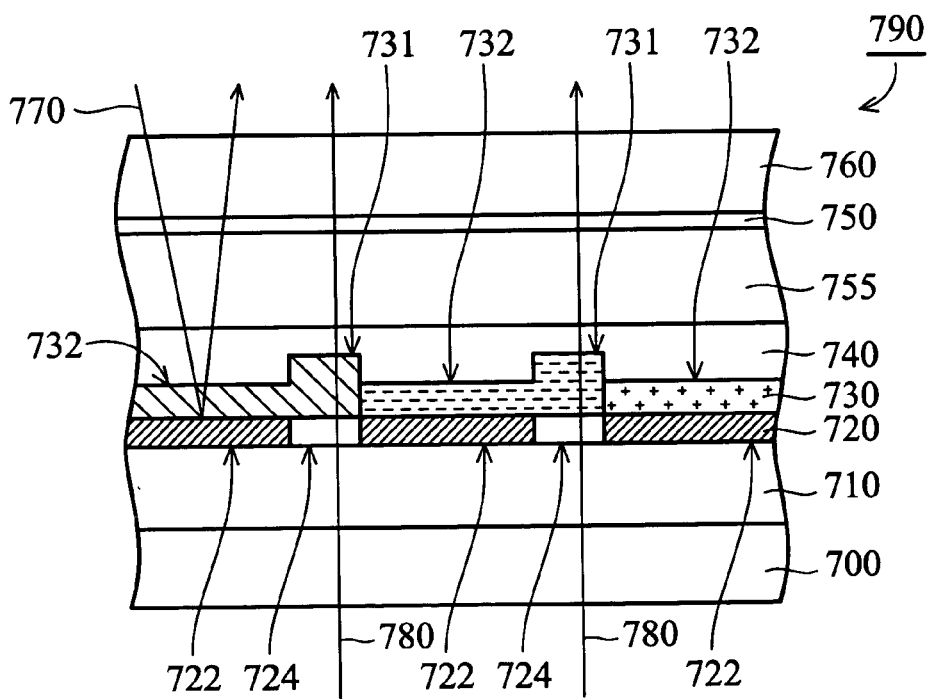

FIG. 7 is a sectional view of another transflective LCD device 790 employing the color filter of the present invention. The transflective LCD device shown in FIG. 7 employs a COA (color filter on array) technology, improving the alignment of the upper and lower substrates. In order to avoid obscuring aspects of the present invention, the detailed LCD process is not described. A lower substrate 700 having a TFT array (not shown) and an insulating layer 710 thereon is provided. A lower electrode (or called a reflective electrode) 720 is formed on the insulating layer 710. The lower electrode 720 has a reflective portion 722 and a transmissive portion 724. The reflective portion 722 can be an aluminum layer and the transmissive portion 724 can be an ITO (indium tin oxide) or IZO (indium zinc oxide) layer. A color filter 730 having various thicknesses, which is fabricated by the present method, is formed on the lower electrode 720. The color filter 730 has a first thickness portion 731 corresponding to the transmissive portion 724 and a second thickness portion 732 corresponding to the reflective portion 722. The first thickness portion 731 is thicker than the second thickness portion 732. A planarization layer 740 (or called an overcoat) composed of a high transmittance material (e.g. $SiO_2$ or $SiN_x$) is formed on the color filter 730. An upper substrate 760 opposing the lower substrate 700 is provided. An upper electrode (or called a common electrode) 750 is formed on the upper substrate 760. Lastly, a liquid crystal material fills a space between the upper substrate 760 and the lower substrate 700 to form a liquid crystal layer 755.

According to the embodiment, referring to FIG. 7, for a reflective mode of the transflective LCD device 790 of the present invention, an ambient light 770 from an exterior light source (not shown) passes through the second thickness portion 732 of the color filter layer 730 twice. For a transmissive mode of the transflective LCD device 790 of the present invention, a backlight 780 from a backlight source (not shown) passes through the first thickness portion 731 of the color filter layer 730 once. Since the first thickness portion 731 is thicker than the second thickness portion 732, the total passage of the ambient light 770 passing through the color filter layer 730 is similar to that of the backlight 780, thereby normalizing color reproduction (color purity) between reflective and transmissive modes of the transflective LCD device.

The present invention provides a transflective liquid crystal display device implementing a color filter having various thicknesses on an upper substrate. Also, the present invention uses only one photomask (i.e. one photolithography) to form the color filter having various thicknesses. The photomask comprises two patterns each with different transmittance. According to the present invention, the total passage of the ambient light passing through the color filter layer is similar to that of the backlight, thereby normalizing color reproduction (color purity) between reflective and transmissive modes of the transflective LCD device.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transflective liquid crystal display device implementing a color filter having various thicknesses, comprising:
    a lower substrate having an insulating layer thereon;
    a lower electrode formed on the insulating layer, wherein the lower electrode has a transmissive portion and a reflective portion;
    a color filter having various thicknesses formed on the lower electrode, wherein the color filter has a first thickness portion and a second thickness portion, the first thickness portion is thicker than the second thickness portion, and the first thickness portion corresponds to the transmissive portion and the second thickness portion corresponds to the reflective portion;
    a transparent organic planarization layer formed on the color filter, wherein the transparent organic planarization layer has a first portion and a second portion, the first portion is thinner than the second portion, and the first portion corresponds to the transmissive portion and the second portion corresponds to the reflective portion;
    an upper substrate opposing the lower substrate;
    an upper electrode formed on the upper substrate; and
    a liquid crystal layer interposed between the upper substrate and the lower substrate.

2. The transflective LCD device according to claim 1, the lower electrode having a first region and a second region thereon, wherein the color filter comprises:
    a thick color resist layer formed on the lower electrode; and
    a thin color resist layer formed on the lower electrode in the second region, wherein the thin color resist layer is formed by removing part of the thick color resist layer in the second region.

3. The transflective LCD device according to claim 1, wherein the organic transparent planarization layer is a benzocyclobutene (BCB) resin or an acryl resin.

4. The transflective LCD device according to claim 2, wherein the thick color resist layer comprises positive or negative photoresist.

5. The transflective LCD device according to claim 4, wherein the thick color resist layer comprises the positive photoresist, further comprising:
    an exposure light and a photomask for performing a photolithography procedure on the thick color resist layer to remove part of the thick color resist layer in the second region;
    wherein the photomask comprises:
    a first pattern for shading the first region from the exposure light; and
    a second pattern for decreasing an intensity of the exposure light penetrating the second pattern, corresponding to the second region.

6. The transflective LCD device according to claim 5, wherein the second pattern is a half-tone pattern.

7. The transflective LCD device according to claim 6, wherein the second pattern comprises a plurality of micro patterns.

8. The transflective LCD device according to claim 4, wherein the thick color resist layer comprises the negative photoresist, further comprising:
    an exposure tight and a photomask for performing a photolithography procedure on the thick color resist layer to remove part of the thick color resist layer in the second region;
    wherein the photomask comprises:
    a first pattern for transmitting the exposure light to the first region; and
    a second pattern for decreasing an intensity of the exposure light penetrating the second pattern, corresponding to the second region.

9. The transflective LCD device according to claim 8, wherein the second pattern is a half-tone pattern.

10. The transflective LCD device according to claim 9, wherein the second pattern comprises a plurality of micro patterns.

11. The transflective LCD device according to claim 1, wherein the color filter comprises a substantially planar bottom surface.

* * * * *